United States Patent [19]
Rieger

[11] Patent Number: 6,068,358
[45] Date of Patent: May 30, 2000

[54] CABINET FOR ACCEPTING ELECTRICAL AND ELECTRONIC COMPONENTS

[75] Inventor: Uwe Rieger, Karlsbad, Germany

[73] Assignee: Schroff GmbH, Straubenhardt, Germany

[21] Appl. No.: 09/031,983

[22] Filed: Feb. 27, 1998

[30] Foreign Application Priority Data

Feb. 27, 1997 [DE] Germany .......................... 197 07 929

[51] Int. Cl.⁷ .................................................. E05D 7/00
[52] U.S. Cl. ................................ 312/329; 49/397; 16/392
[58] Field of Search .................................. 312/329, 296, 312/138.1, 265.1, 265.2, 265.3, 265.4, 326, 327, 328, 223.1, 140; 211/26; 49/397, 399; 16/392, 387

[56] References Cited

U.S. PATENT DOCUMENTS

| 1,870,534 | 8/1932 | Skoogh | 312/140 |
| 1,981,710 | 11/1934 | Rix | 312/296 |
| 2,805,740 | 9/1957 | Quinn . | |
| 3,316,041 | 4/1967 | Nelson | 312/140 |
| 5,228,762 | 7/1993 | Mascrier | 312/265.1 X |
| 5,423,149 | 6/1995 | Herbst | 49/399 X |
| 5,561,886 | 10/1996 | Flamme . | |

FOREIGN PATENT DOCUMENTS

| 2 690 792 | 11/1993 | France . |
| 42 24 468 C1 | 12/1993 | Germany . |
| WO 93/10692 | 6/1993 | WIPO . |

*Primary Examiner*—Janet M. Wilkens
*Attorney, Agent, or Firm*—Merchant & Gould P.C.

[57] ABSTRACT

A cabinet for the acceptance of electrical and electronic components includes a rack to which a door leaf 8 having a hinge 2 as well as wall elements are mounted in a detachable fashion, the hinge 2 having at least one stationary section 3 attached to a side rail 1 of the rack as well as at least one pivoting section 4 attached to the door leaf 8. The cabinet is improved in such a fashion that the pivot axis 13 of the hinge 2 is disposed in the vicinity of the outer side of the door 14. A cabinet is thereby created whose wall elements can not be accessed from the outside whose attachment elements in the vicinity of the hinge 2 are advantageously easily accessible by opening the cabinet door even when the cabinet is fully equipped and without having to remove its contents.

6 Claims, 2 Drawing Sheets

CABINET FOR ACCEPTING ELECTRICAL AND ELECTRONIC COMPONENTS

BACKGROUND OF THE INVENTION

The invention concerns a cabinet for accepting electrical and electronic components having a rack to which a door leaf having a hinge as well as wall elements are mounted in a detachable fashion, wherein the hinge has at least one stationary section attached to a side rail of the frame as well as at least one pivoting section attached to the door leaf and the pivot axis of the hinge is disposed in the vicinity of the outer side of the door leaf.

These types of cabinets are utilized as circuit component cabinets in electrical technology or as electronic cabinets. The frame of such a cabinet usually supports modules as well as various other types of built-in and insert elements and forms the supporting structure for the cabinet. The housing of the cabinet is effected through the introduction of wall elements and a door leaf on the rack. The housing visually covers the contents of the cabinet, effects mechanical protection and, if necessary, electromagnetic shielding.

DE 94 03 989 41 describes a hinge in a conventional circuit cabinet having a cabinet housing and a door leaf, wherein the door leaf has a bent edge in the vicinity of the hinge and the pivot axis of the hinge is disposed in the vicinity of the outer side of the door leaf. DE 39 30 134 C2 discloses a housing (module or circuit cabinet) having rack elements to which a door leaf is mounted in a detachable fashion via a hinge, wherein the pivot axis of the hinge is likewise disposed in the vicinity of the outer side of the door.

DE 93 04 072 41 UI and DE 42 24 468 Cl each disclose a cabinet of the above mentioned kind, namely a circuit cabinet having a frame to which a door leaf with a hinge as well as wall elements are attached, wherein the pivot axis of the hinge is disposed in the vicinity of the outer side of the door leaf.

For reasons of appearance but above all in order to prevent unauthorized access to the contents of the cabinet, it is necessary that the door leaf and the wall elements be mounted to the rack using mounting elements which can only be accessed from the inside. Towards this end a free access from the inside of the cabinet to the above mentioned mounting elements is necessary. In order to facilitate free access to an equipped cabinet it is however necessary to first remove and then reinsert the built-in components.

It is the purpose of the invention to improve a cabinet of the above mentioned kind such that it is possible to attach its wall elements in the vicinity of the door leaf in such a fashion that they can be mounted and dismounted even if the cabinet is completely equipped without having to remove the inserts or built-in components.

SUMMARY OF THE INVENTION

The pivot axis of the hinge with which the door leaf is mounted to the side rail of a cabinet in accordance with the invention is disposed in the region of the outer side of the door leaf. The pivot axis is borne in front of the side rail in such a fashion that the edge region of the door leaf associated with the hinge seats essentially between the pivot axis and the side rail in the closed state. In order to open the cabinet, the door leaf is pivoted about the pivot axis disposed on its outer side as result of which the narrow side of the door leaf describes an arc to move away from the side rail. The narrow side of the door leaf thereby provides access, when the door is opened, to a region of the hinge between the hinge axis and the side rail to which a side wall element can be mounted in such a fashion that the mounting elements can only be accessed when the cabinet door is opened. This accessibility is also guaranteed when the cabinet is completely equipped, since the built-in components naturally only extend at most up to the inner side of the door leaf.

In accordance with the invention the entire thickness of the door leaf is therefore utilized as an additional region, separated from the inside but not accessible from the outside, at which at least one of the side wall elements can be mounted. In this manner it is possible to configure a mounting which is sufficiently stable that the side wall element can have additional components such as a heat exchanger, a cooling apparatus or a cable input box. The side wall element can also be completely replaced by such added components which then must be specially adapted to this purpose.

The side wall element can also be a side door, wherein same is preferentially mounted to at least one additional pivoting section of the hinge to thereby pivot about the same pivot axis as the front door leaf.

The side wall element is advantageously mounted to the side rail with first mounting elements, wherein these first mounting elements are accessible from that side of the stationary section of the hinge facing away from the side wall element and disposed between the pivot axis of the hinge and the side rail. The first mounting elements are preferentially covered by the narrow side of the door leaf when the door is closed to thereby be exclusively accessible when the door leaf is removed or the door is opened.

In a similar fashion, it is possible for the door leaf to be attached to the pivoting section of the hinge by means of additional mounting elements, wherein these additional mounting elements are covered by the side wall element when the door is closed and are disposed between the pivot axis of the hinge and the side rail. One thereby guarantees that the mounting of the door leaf is also not accessible from the outside when the door is closed. When the door is opened, the door leaf can however be easily dismounted, since the above mentioned additional mounting elements pivot along a curved path away from the side rail and the stationary hinge section when the door is opened and are thereby easily accessed.

For improved sealing with respect to ambient dust or moisture it is advantageous to dispose one sealing element between the side rail and the side wall element as well as between the door leaf and the side rail which e.g. can be made from rubber. It is also conceivable to utilize contact elements for RF-shielding instead of the above mentioned sealing elements.

An embodiment of the invention is explained more closely below with reference to the associated drawing.

DETAILED DESCRIPTION

Figure 1:
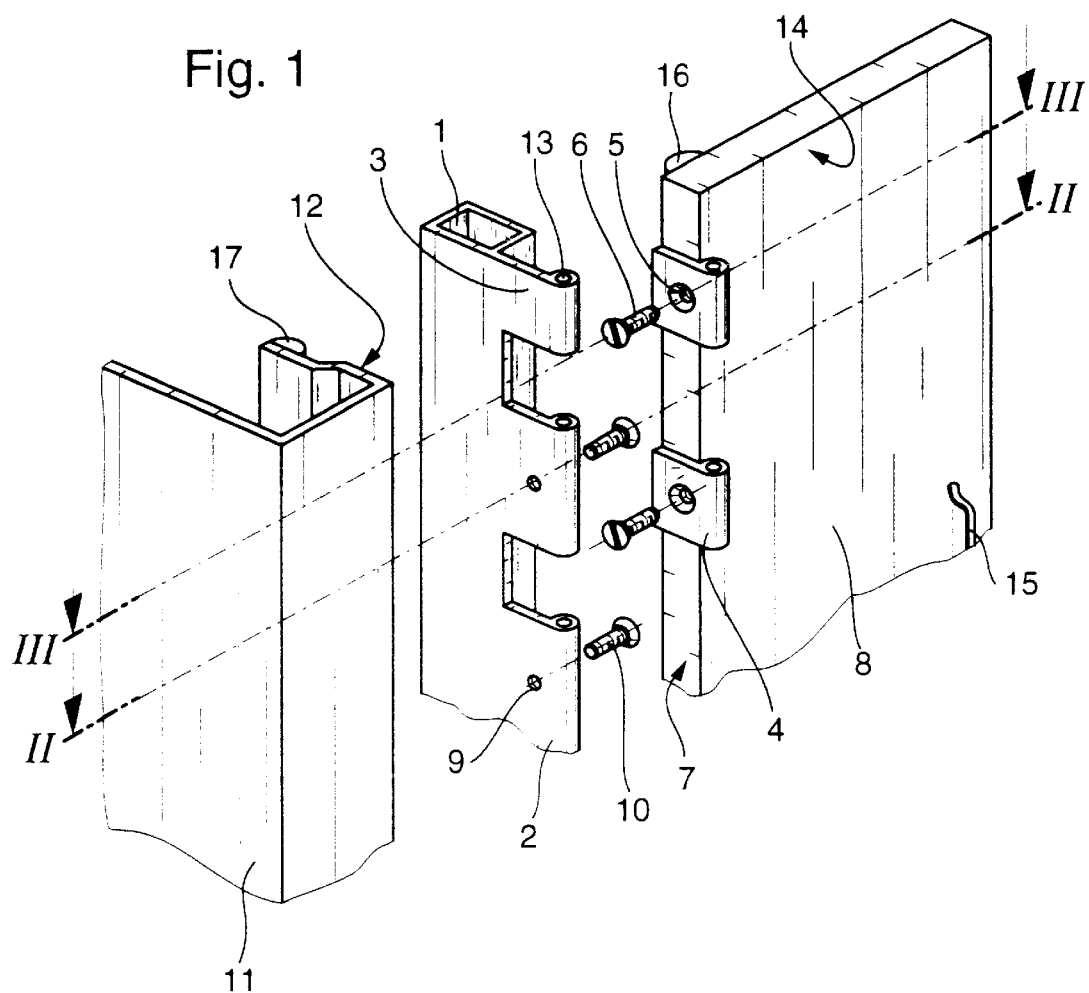
FIG. 1 shows a perspective exploded view of a part of a hinge of a cabinet in accordance with the invention with side rail, door leaf and side element.

FIG. 1 shows a side rail 1 of a rack (not shown) in a cabinet in accordance with the invention. The side rail 1 supports a hinge 2 having a stationary section 3 and a pivoting section 4 fitting into the openings thereof. The stationary section 3 of the hinge 2 can be formed on the side rail 1 or mounted thereto in a suitable manner.

Bore holes 5 are fashioned in the pivoting section 4 of the hinge 2 through each of which a screw 6 can be screwed into a narrow side 7 of a door leaf 8.

The stationary section 3 of the hinge 2 has bore holes a through which a screw 10 can be screwed into a side wall element 11 which is adjacent to hinge 2 with a seating surface 12.

The pivot axis 13 of the hinge 2 is separated from the side rail 1 in such a fashion that it is still in front of the outer side of the door leaf 14 when the door is closed.

A handle 15 as well as a sealing element 16 can also be recognized on the door leaf 8. The side wall element 11 supports a corresponding sealing element 17.

Figure 2:
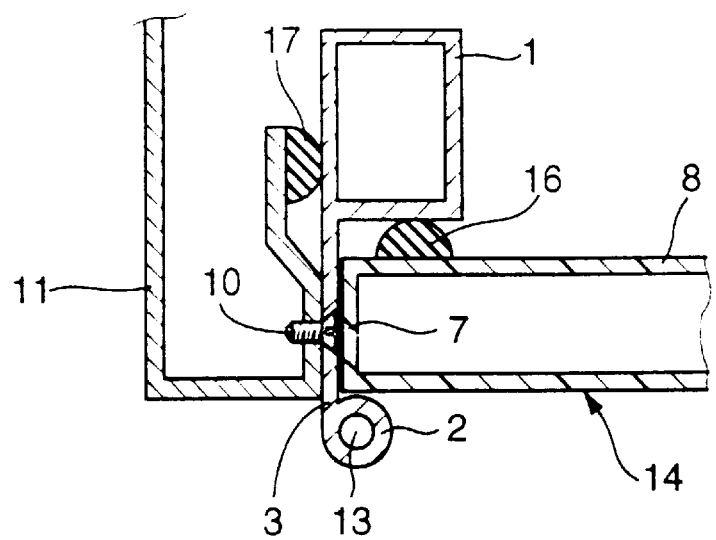
FIG. 2 shows a cut representation along the line II—II in accordance with FIG. 1.

FIG. 2 shows the configuration represented in FIG. 1 in an assembled state cut along line II—II. The side rail 1 is, in the present example, integrally connected with the visible stationary section 3 of the hinge 2. The door leaf 8 covers, with its narrow side 7, the screw 10 connecting the side wall element 11 to the stationary section 3 of the hinge 2 in a detachable fashion. In the closed state of the cabinet shown, the screw 10, which serves as a first attachment element for the side wall element 11, is therefore not accessible.

FIG. 2 clearly shows the position of the sealing elements 16 and 17 when the door is closed.

Figure 3:
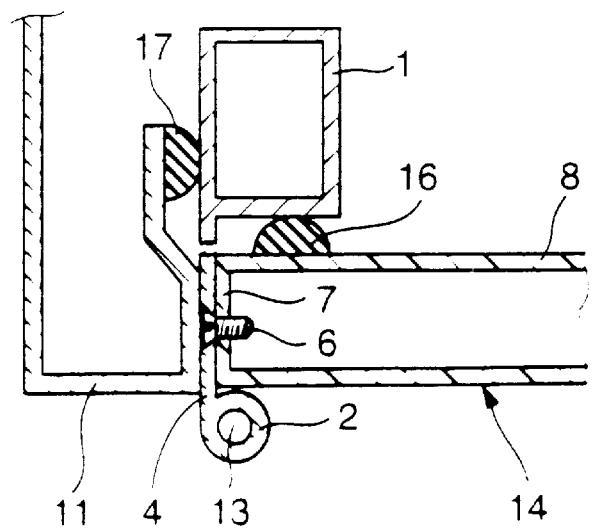
FIG. 3 shows a cut representation along the line III—III in accordance with FIG. 1.

FIG. 3 shows a cut representation of the configuration of FIG. 1 along the line III—III. The pivoting section 4 of the hinge 2 can be seen herein and is only indirectly connected to the side rail 1 via the pivot axis 13 of the hinge 2. The pivoting section 4 of the hinge 2 is mounted to the narrow side 7 of the door leaf 8 by means of the screw 6, wherein, in the closed state of the door shown, the side wall element 11 covers the pivoting section 4 of the hinge 2 and thereby also the screw 6. The screw 6, which serves as additional attachment element for mounting the door leaf 8 to the pivoting section 4 of the hinge 2, is therefore also not accessible when the door is closed.

As can be seen from FIGS. 1 through 3, the screws 6 and 10 are easily accessible when the door is open, since the pivot axis 13 of the hinge 2 is mounted in front of the outer side of the door leaf 14 so that, when the door is fully opened, a wide opening of the intermediate space between the pivot axis 13 and the side rail 1 thereby results, wherein the screws 6 and 10 each describe a curved path when the cabinet is opened. The attachments of the door leaf 8 and the side wall element 11 to the side rail 1 of the rack (not shown) are therefore not accessible from the outside. These elements are nevertheless easily detached when the cabinet door is opened without having to change the contents of the cabinet.

SUMMARY OF REFERENCE SYMBOLS 1 side rail
2 hinge
3 stationary section (of 2)
4 pivoting section (of 2)
5 bore hole (in 4)
6 screw
7 narrow side (of 8)
8 door leaf
9 bore hole (in 3)
10 screw
11 side wall element
12 seating surface (of 11)
13 pivot axis (of 2)
14 outer side of door leaf
15 handle
16 sealing element
17 sealing element

What is claimed is:

1. A cabinet for accepting electrical and electronic components, the cabinet comprising:
   a side rail;
   a door leaf (8) having a hinge (2);
   wherein the hinge (2) has at least one stationary section (3) mounted to the side rail (1) and a pivoting section (4) mounted to the door leaf (8); wherein a pivot axis (13) of the hinge (2) is disposed proximate an outer side of the door leaf (14);
   a side wall element (11) mounted on the stationary section (3) of the hinge (2), wherein the side wall element (11) is attached with a first mounting element disposed in an accessible fashion on a side of the stationary section (3) of the hinge (2) facing away from the side wall element (11) and intermediate the pivot axis (13) of the hinge (2) and the side rail (1).

2. The cabinet according to claim 1, wherein the first mounting element is covered by a narrow side (7) of the door leaf (8) when the door leaf (8) is closed.

3. The cabinet according to claim 2, wherein the door leaf (8) is attached to the pivoting section (4) of the hinge (2) by additional mounting elements, wherein the additional mounting elements are covered by the side wall element (11) when the door leaf (8) is closed and are disposed between the pivot axis (13) of the hinge (2) and the side rail (1).

4. The cabinet according to claim 1, wherein a first sealing element (17) is disposed between the side wall element (11) and the side rail (1).

5. The cabinet according to claim 4, wherein a second sealing element (16) is disposed between the door leaf (8) and the side rail (1).

6. A cabinet for electrical and electronic components, the cabinet comprising:
   a side rail;
   a door leaf having a hinge, wherein the hinge has a first section mounted to the side rail and a second section mounted to the door leaf,
   a wall element detachably mounted to the side rail;
   the wall element mounted on the first section of the hinge;
   wherein a pivot axis of the hinge is disposed exteriorly of the door leaf;
   wherein the wall element is attached with a first mounting element disposed in an accessible fashion on a side of the stationary section of the hinge facing away from the wall element and intermediate the pivot axis of the hinge and the side rail.

* * * * *